US012100566B2

(12) United States Patent
Dong

(10) Patent No.: US 12,100,566 B2
(45) Date of Patent: Sep. 24, 2024

(54) INTELLIGENT SWITCH PANEL AND INTELLIGENT REMOTE CONTROL SWITCH SYSTEM

(71) Applicant: THIRD REALITY, INC., Jiangsu (CN)

(72) Inventor: Xuezhang Dong, Jiangsu (CN)

(73) Assignee: THIRD REALITY, INC., Jiangsu (CN)

( * ) Notice: Subject to any disclaimer, the term of this patent is extended or adjusted under 35 U.S.C. 154(b) by 350 days.

(21) Appl. No.: 17/756,414

(22) PCT Filed: Nov. 26, 2019

(86) PCT No.: PCT/CN2019/120874
§ 371 (c)(1),
(2) Date: May 24, 2022

(87) PCT Pub. No.: WO2021/102667
PCT Pub. Date: Jun. 3, 2021

(65) Prior Publication Data

US 2023/0005674 A1 Jan. 5, 2023

(51) Int. Cl.

| | |
|---|---|
| ***H02H 3/26*** | (2006.01) |
| ***G08C 17/02*** | (2006.01) |
| ***H01H 3/26*** | (2006.01) |
| ***H01H 9/02*** | (2006.01) |
| ***H01H 13/14*** | (2006.01) |
| ***H01H 23/16*** | (2006.01) |

(52) U.S. Cl.
CPC ............... *H01H 3/26* (2013.01); *G08C 17/02* (2013.01); *H01H 9/0214* (2013.01); *H01H 13/14* (2013.01); *H01H 23/16* (2013.01); *G08C 2201/42* (2013.01)

(58) Field of Classification Search
CPC .......... H01H 3/26; H01H 9/0214; H01H 9/02; H01H 13/14; H01H 23/16; G08C 17/02; G08C 2201/42
See application file for complete search history.

(56) References Cited

U.S. PATENT DOCUMENTS

2010/0222096 A1 9/2010 Griffin

FOREIGN PATENT DOCUMENTS

| | | |
|---|---|---|
| CN | 104867721 A | 8/2015 |
| CN | 107240238 A | 10/2017 |
| CN | 107633965 A | 1/2018 |
| CN | 109459983 A | 3/2019 |
| CN | 109786139 A | 5/2019 |

OTHER PUBLICATIONS

International Search Report (with English translation) and Written Opinion issued in PCT/CN2019/120874, mailed Aug. 27, 2020, 8 pages provided.

*Primary Examiner* — Robert L Deberadinis
(74) *Attorney, Agent, or Firm* — HSML P. C.

(57) ABSTRACT

The invention discloses a smart switch panel and a smart remote control switch system. The smart switch panel includes a housing, an actuating device arranged in the housing and a microprocessor arranged in the housing to control the actuating device, and the actuating device includes a rotating rod and a driving member, the rotating rod cooperates with the driving member and pushes the driving member to move in a direction parallel to the rotating rod when the rotating rod rotates, so as to drive the switch to switch when the smart switch panel is mounted on the switch.

20 Claims, 15 Drawing Sheets

INTELLIGENT SWITCH PANEL AND INTELLIGENT REMOTE CONTROL SWITCH SYSTEM

TECHNICAL FIELD

The invention relates to the field of artificial intelligence, in particular to an smart switch panel and an smart remote control switch system.

BACKGROUND

With the rapid development of Internet of Things technology, the concept of intelligent life is constantly affecting people of all ages. Smart control switches are slowly entering people's lives, and their convenient use is highly sought after by young people. At the same time, this concept is also liked by some special groups, such as some people who have just undergone surgery, elders or physically handicapped people. Because of their inconvenience in daily activities, they are more eager for a product that can make them have a better life and a higher quality of life. However, some smart control switches on the market today are almost different in size from the existing switches, which is a little impractical for some elderly people with limited mobility due to accidental injuries or older ages, because if you want to install the smart switch, you need to perform secondary treatment on the switch on the wall, either expanding the switch hole or filling the switch hole, or even removing the original switch and installing a new switch. This not only causes the waste of the original switch, but also brings about potential safety hazards.

In addition, there are mainly two types of switches on the market: toggle switch and rocker switch. Some smart control switches can only be suitable for one type of switch, and cannot be compatible with various types of switches, and the market audience is limited.

SUMMARY

The purpose of the present invention is to provide an smart switch panel to solve the problems of complicated installation, poor versatility and waste of resources when modifying the existing switch by the current smart switch.

In order to solve the above problems, according to an aspect of the present invention, an smart switch panel is provided, comprising: a housing; an actuating device arranged in the housing; a microprocessor arranged in the housing which controls the actuating device, wherein the actuating device includes a rotating rod and a driving member, the rotating rod cooperates with the driving member and is configured to drive the driving member to translate when the rotating rod rotates.

In an embodiment, an outer surface of the rotating rod is provided with a helical groove extending in an axial direction, and the driving member is provided with a protrusion on one side thereof for cooperating with the helical groove.

In an embodiment, the driving member is further provided with a protruding block on a side thereof opposite to the protrusion, which cooperates with a corresponding structure on the housing to limit the driving member vertically.

In an embodiment, the driving member is provided with a central opening cooperating with a toggle switch, and the central opening is formed by side plates surrounding, and the driving member is provided with a driving pressing block at a bottom thereof for cooperating with a rocker switch.

In an embodiment, the driving pressing block is located at a bottom of the side plate where the protrusion and the protruding block are provided, and the driving pressing block extends integrally from the bottom of the side plate.

In an embodiment, the housing includes a main body, which has an upper surface cooperating with the cover and a lower surface cooperating with the switch to be controlled, the lower surface is provided with first connecting portions for cooperating with the rocker switch and second connecting portions for cooperating with the toggle switch.

In an embodiment, the first connecting portions are disposed on both ends of the lower surface, and the second connecting portions are disposed between the first connecting portions.

In an embodiment, the smart switch panel further includes connecting members, and the first connecting portions and the second connecting portions are formed by a plurality of protruding elastic tabs enclosing in an arc shape on the lower surface and are used to cooperate with the connecting members respectively.

In an embodiment, the connecting member has a cylindrical body forming with a plurality of elastic tabs on an upper end thereof, a peripheral protruding portion protruding outwardly at a middle portion thereof, and a fixing hole at a bottom thereof.

In an embodiment, the main body is formed with a driving member mounting hole in the middle thereof in which the driver is mounted, wherein the driving member mounting hole extends along the length direction of the housing, thereby the driving member is movable along the length direction of the housing in the driving member mounting hole.

In an embodiment, a battery mounting slot and a rotating rod mounting portion are respectively formed on both sides of the driving member mounting hole, wherein the battery mounting slot is used to accommodate a battery, and the rotating rod is accommodated in the rotating rod mounting portion.

In an embodiment, the smart switch panel further includes a motor, which is installed in the housing and connected with the rotating rod to drive the rotating rod to rotate, wherein the motor is coupled to the microprocessor.

In an embodiment, the smart switch panel further includes a circuit board, which is provided with a wireless communication module and the microprocessor.

In an embodiment, the microprocessor and the wireless communication module are integral.

In an embodiment, the wireless communication module is a Zigbee module, a WIFI module or other wireless communication modules.

In an embodiment, the circuit board is provided with a current limiting circuit, which is used to check whether the motor has turned in place by detecting a current of the motor.

In an embodiment, the circuit board is provided with an LED light for indicating a working state.

In an embodiment, the smart switch panel further includes a cover, which cooperates with the upper surface of the housing, the cover is provided with a button, the circuit board is provided with a pressing key cooperating with the button, and the pressing key is connected to the microprocessor.

In an embodiment, the corresponding structures on the housing are a sliding rail and a blocking plate, wherein the blocking plate is installed above the sliding rail and limits the protruding block in a direction perpendicular to the slide rail.

In an embodiment, the driving member is further provided with a sliding block, which is provided on a side plate below the protrusion, and the housing is provided with a sliding groove cooperating with the sliding block, when the driving member is mounted in a driving member mounting groove of the housing, the sliding block extends into the sliding groove.

In an embodiment, the rotating rod and the driving member are configured to drive the driving member to move in a direction parallel to a rotation axis of the rotating rod when the rotating rod rotates, so as to drive a switch to switch between on and off states when the smart switch panel is mounted on the switch.

According to another aspect of the present invention, a smart remote control switch system is provided, comprising: the above-mentioned smart switch panel; a cloud server for receiving and sending signals; and a client terminal for sending signals to the cloud server; wherein the client terminal, the cloud server and the smart switch panel being connected through a wireless network.

In an embodiment, the smart remote control switch system further includes a HUB, which includes a WIFI/ZigBee module for converting signals.

According to another aspect of the present invention, a smart remote control switch system is provided, comprising: the above-mentioned smart switch panel; a cloud server for receiving and sending signals; and a voice recognition device for voice recognition and sending signals to the cloud server; wherein the voice recognition device, the cloud server and the smart switch panel are connected through a wireless network.

In an embodiment, the intelligent remote control switch system further includes a HUB, which includes a WIFI/ZigBee module for converting signals.

The main advantages of the present invention include:

(a) The product of the present invention can be compatible with various types of switches, and has many market acceptances, broad prospects and strong product competitiveness.

(b) The product of the present invention can be installed without removing the existing switch panel, which overcomes the previous problems of complicated installation and waste of resources when modifying the existing switch with the smart switch, eliminates potential safety hazards, and realizes one-click installation.

(c) The housing is provided with first connecting portions and second connecting portions, which helps to make the smart switch panel of the present invention more versatile and can be adapted to different switches.

(d) The product of the present invention uses a ZigBee module, which consumes less power and has a longer product use time, in addition, networking can be easily realized, signal transmission can be performed in a relatively long range, and long-distance communication and remote control can be realized through networking technology, while Wi-Fi has better compatibility, covers a large area in daily life, and can transmit a large amount of data by combining the ZigBee module and Wi-Fi, they can complement to each other, and more functions can be achieved.

(e) The product of the present invention can control the on and off states of the switch by voice, which reduces the manual operation process of the user, brings a fresh and avant-garde experience to the user, brings new development space to the market, and promotes the development of voice recognition technology.

(f) The product of the present invention has strong cloud system support behind it, which can realize services such as one-click online upgrade, and at the same time can collect user usage data to provide guidance for product replacement. The big data analysis realized on the cloud can be used to upgrade product adaptive and self-decision systems in the future, improve user experience and reduce user participation, so as to achieve the effect of full automation.

It should be understood that within the scope of the present invention, the above-mentioned technical features of the present invention and the technical features specifically described in the following (e.g. the embodiments) can be combined with each other to form new or preferred technical solutions. Due to space limitations, they will not be repeated here.

DETAILED DESCRIPTION OF THE INVENTION

Figure 1:
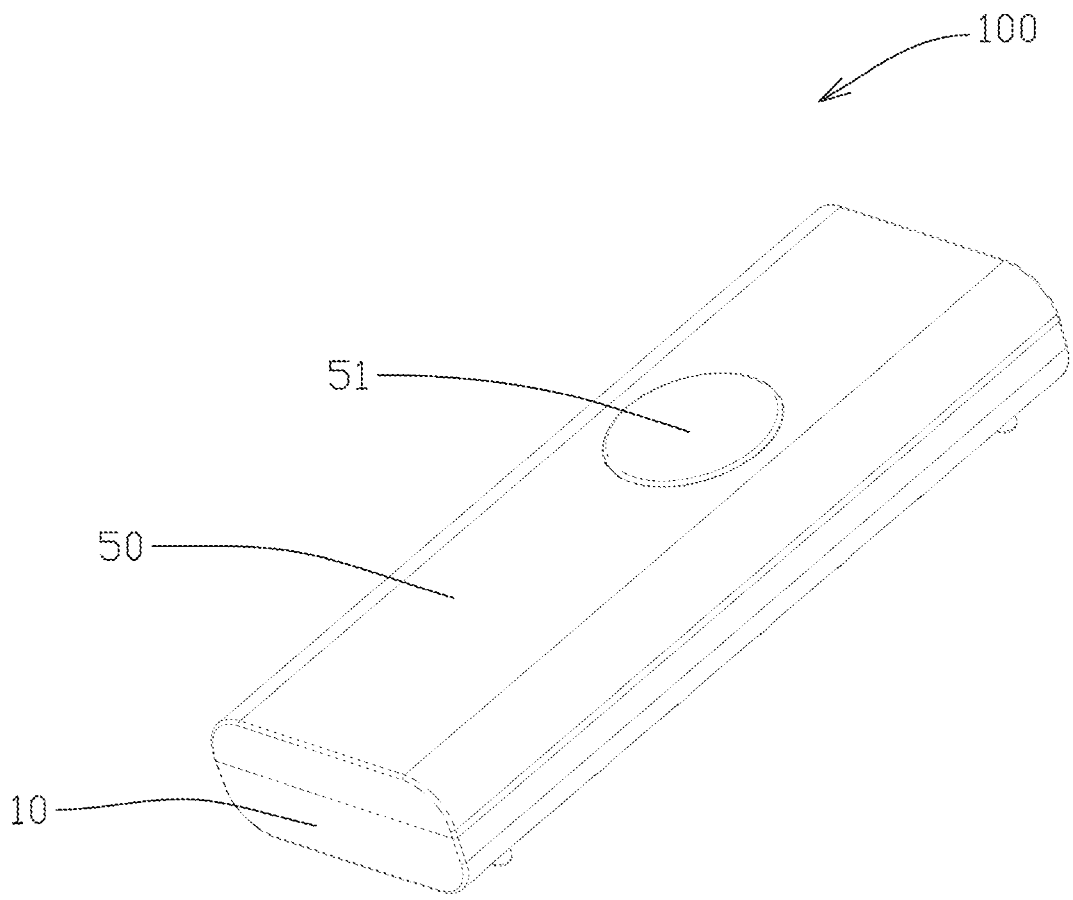
FIG. 1 is a perspective view of a smart switch panel according to an embodiment of the present invention.

The preferred embodiments of the present invention will be described in detail below with reference to the accompanying drawings, so as to more clearly understand the objects, features and advantages of the present invention. It should be understood that the embodiments shown in the accompanying drawings are not intended to limit the scope of the present invention, but are only intended to illustrate the essential spirit of the technical solutions of the present invention.

In the following description, for the purpose of illustrating various disclosed embodiments, certain specific details are set forth in order to provide a thorough understanding of the various disclosed embodiments. However, One skilled in the relevant art will recognize that embodiments may be practiced without one or more of these specific details. In other instances, well-known devices, structures and techniques associated with this application may not be shown or described in detail to avoid unnecessarily obscuring the description of the embodiments.

Reference throughout this specification to “one embodiment” or “an embodiment” means that a particular feature, structure, or characteristic described in connection with the embodiment is included in at least one embodiment. Thus, the appearances of “in one embodiment” or “in an embodiment” in various places throughout the specification are not necessarily all referring to the same embodiment. Additionally, the particular features, structures or characteristics may be combined in any manner in one or more embodiments.

In the following description, in order to clearly show the structure and working mode of the present invention, various directional words will be used for description, but “front”, “rear”, “left”, “right”, “outer”, “inner”, “outward”, “inward”, “up”, “down” and other words should be understood as convenient terms, and should not be understood as limiting words.

After extensive and in-depth research, the inventor has developed an smart switch panel at the earliest, the rotating rod in the panel housing is combined with the first switch nesting hole, and can push the rod of the toggle switch, and the rotating protruding block on the rotating body is combined with the rotating hole and the switch nesting groove, can push the rod of the rocker switch, and the above mentioned components integration on one panel render the smart switch panel being compatible with many different types of switches, so as to realize the switching of switch state. Based on this, the present invention is completed.

Terms

As used herein, the term “HUB” refers to a multi-port transponder.

The term “distal end” refers to the farther end relative to the motor.

The term “proximal end” refers to the closer end relative to the motor.

Smart Switch Panel

The present invention provides an smart switch panel, comprising a housing, an actuating device and a microprocessor, the actuating device is arranged in the housing and is used to perform on-off switching operation on the switch when the smart switch panel is mounted on a switch, the microprocessor is arranged in the housing to control the actuating device, the actuating device includes a rotating rod and a driving member, the rotating rod cooperates with the driving member and drives the driving member to move in a direction parallel to the rotating rod when rotating, so as to drive the switch to switch between on and off states when the smart switch panel is mounted on the switch.

Before the product of the present invention is implemented, the screws on the existing switch panel are unscrewed, screw holes on the existing switch panel are aligned with fixing holes provided on a connecting member on a lower surface of the housing, and the housing and the existing switch panel are fixedly connected with screws.

One of the ways of using the product of the present invention is: an “on/off” signal is sent to a cloud server through a mobile phone APP, iPad, PC or voice recognition device, and a WIFI/ZigBee module in the HUB converts the WIFI signal sent by the cloud server into a ZigBee signal and then transmits the ZigBee signal to a ZigBee module in the smart switch panel, after receiving the signal from the ZigBee module, the microprocessor controls the motor to rotate, the actuating device rotates under the drive of the motor’s transmission shaft. When the product of the present invention is mounted on a toggle switch, a rod of the toggle switch extends into a central opening of the driving member, and drives the driving member to move along the axial direction of the rotating rod during the rotation of the rotating rod, the rod of the toggle switch is pushed to the other position, so as to realize on-off switching of the toggle switch. When the product of the present invention is mounted on the rocker switch, a driving pressing block of the driving member is in contact with a button of the rocker switch and drive the driving member to move along the axial direction of the rotating rod during the rotation of the rotating rod, the driving pressing block of the driving member press the button of the rocker switch to switch the on-off states of the rocker switch.

The circuit board of the product of the present invention is provided with a current-limiting circuit, which is used to check whether the motor has turned to position by detecting the current of the motor, when it is detected that the current of the motor reaches a specific value, it is confirmed that the motor has turned to position, and the microprocessor controls the motor to stop rotating, and the switch state is switched at this time. When the next opposite command signal is received, the microprocessor controls the motor to rotate in the direction opposite to the previous direction, and the actuating device moves in the direction opposite to the previous direction.

Another way of using the product of the present invention is: the button on the outer surface of the housing cover is pressed to trigger a pressing key on the circuit board, so that the microprocessor operates and controls the rotation of the motor.

Smart Remote Control Switching System

The present invention also provides a smart remote control switching system including: a client terminal, a cloud server, a HUB, and the above-described smart switch panel.

The client terminal sends the “On/Off” signal to the cloud server, and the WiFi/ZigBee module in the HUB converts the WiFi signal from the cloud server to the ZigBee signal and then sends the same to the ZigBee module in the smart switch panel, after the microprocessor receives the signal from the ZigBee module, it controls the motor rotation to achieve remote control.

The client terminal includes: a mobile phone APP, an IPAD, or a PC. For example: a mobile phone connects to the HUB, sends AP information to the Hub via the APP, the HUB connects to an AP and disconnects the connection with the mobile phone, after the HUB is connected to the AP, it sends a cloud request to a cloud, the cloud is connected to the HUB via the APP, the link is always established and kept, and responses to the action of the cloud and the hub at any time, the product is installed on the switch in accordance with the instructions in the APP, and the networking is configured through the mobile phone, when the product is connected to the HUB, it will enter a cycle of sleep and wake-up and wait for the Hub’s commands, when receiving the commands, the corresponding response is made, and the state after the response is transmitted to the cloud for updating.

The present invention also provides an smart remote control switching system including: a voice recognition device, a cloud server, a HUB, and the above-described smart switch panel.

A voice from the user is received by the voice recognition device, the cloud server receives the signal identified by the voice recognition device, and a WiFi/ZigBee module in the HUB converts the WiFi signal from the cloud server to the ZigBee signal and then sends it to a ZigBee module in the smart switch panel, the microprocessor receives the signal from the ZigBee module to control the motor rotation.

The main advantages of the present invention include:

(a) The products of the present invention can be compatible with various types of switches, has many market acceptances, broad prospects and strong product competitiveness.

(b) The product of the present invention can be installed without removing the existing switch panel, which overcomes the previous problems of complicated installation and waste of resources when modifying the existing switch with the smart switch, eliminates potential safety hazards, and realizes one-click installation.

(c) The housing is provided with first connecting portions and second connecting portions, which helps to make the smart switch panel of the present invention more versatile and can be adapted to different switches.

(d) The product of the present invention uses a ZigBee module, which consumes less power and has a longer product use time, in addition, networking can be easily realized, signal transmission can be performed in a relatively long range and long-distance communication and remote control can be realized through networking technology, while Wi-Fi has better compatibility, covers a large area in daily life, and can transmit a large amount of data, by combining the ZigBee module and Wi-Fi, they can complement to each other, and more functions can be achieved.

(e) The product of the present invention controls the on and off state of the switch by voice, which reduces the manual operation process of the user, brings a fresh and avant-garde experience to the user, brings new development space to the market, and promotes the development of voice recognition technology.

(f) The product of the present invention has strong cloud system support behind it, which can realize services such as one-click online upgrade, and at the same time can collect user usage data to provide guidance for product replacement. The big data analysis realized on the cloud can be used to upgrade product adaptive and self-decision systems in the future, improve user experience and reduce user participation, so as to achieve the effect of full automation.

Embodiments of the present invention will be described with reference to FIGS. 1-15.

Figure 2:
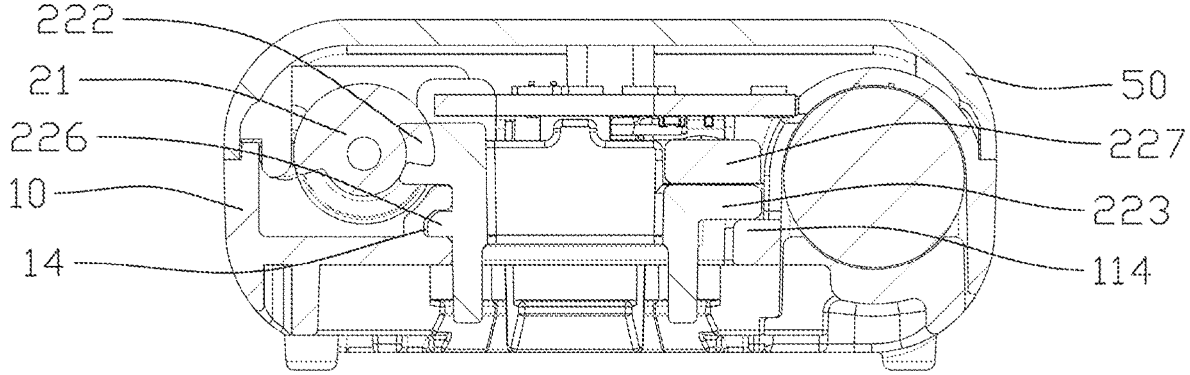
FIG. 2 is the sectional view of the smart switch panel of FIG. 1.
Figure 3:
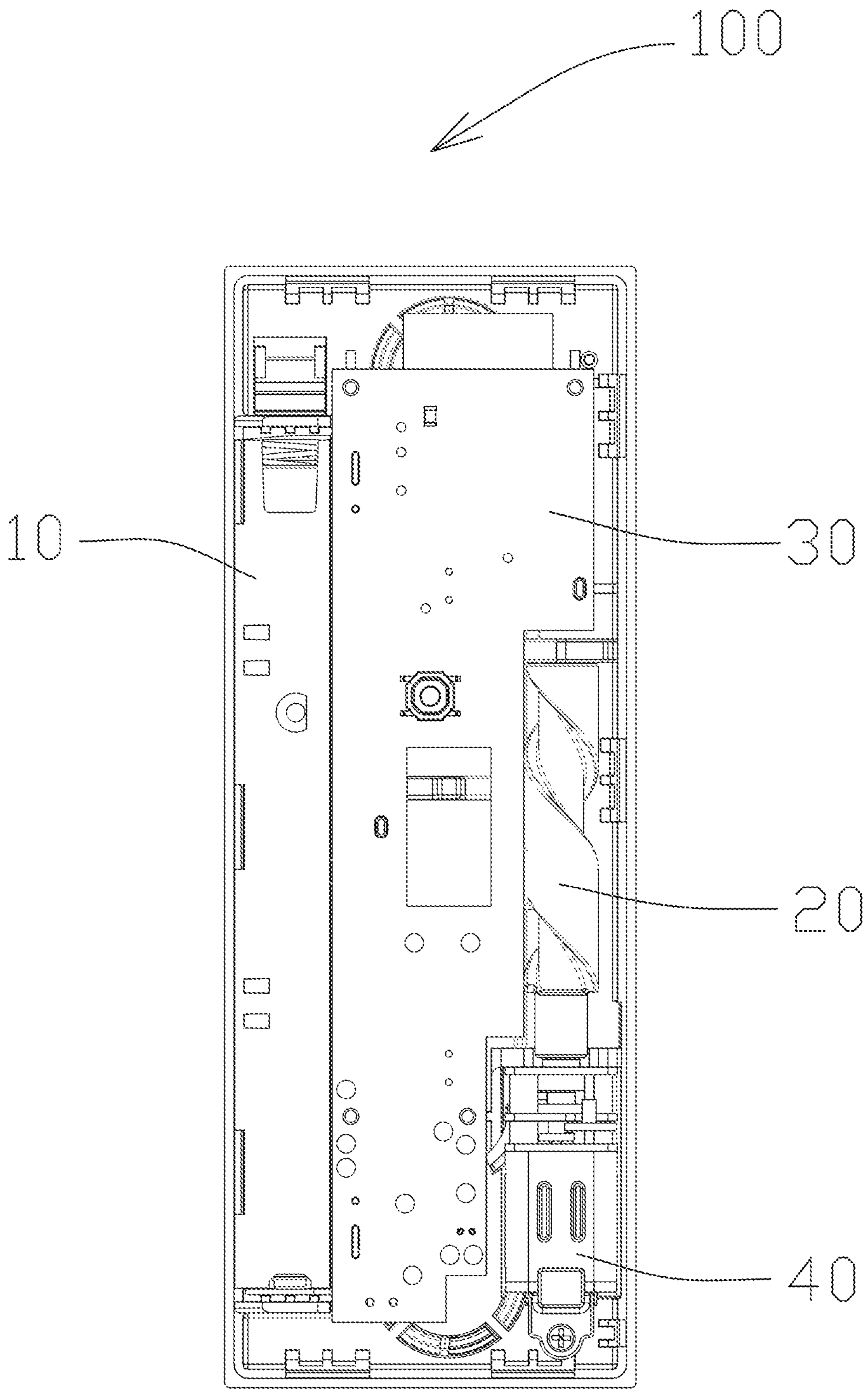
FIG. 3 is a top view of a smart switch panel according to an embodiment of the present invention, in which a cover has been removed.
Figure 4:
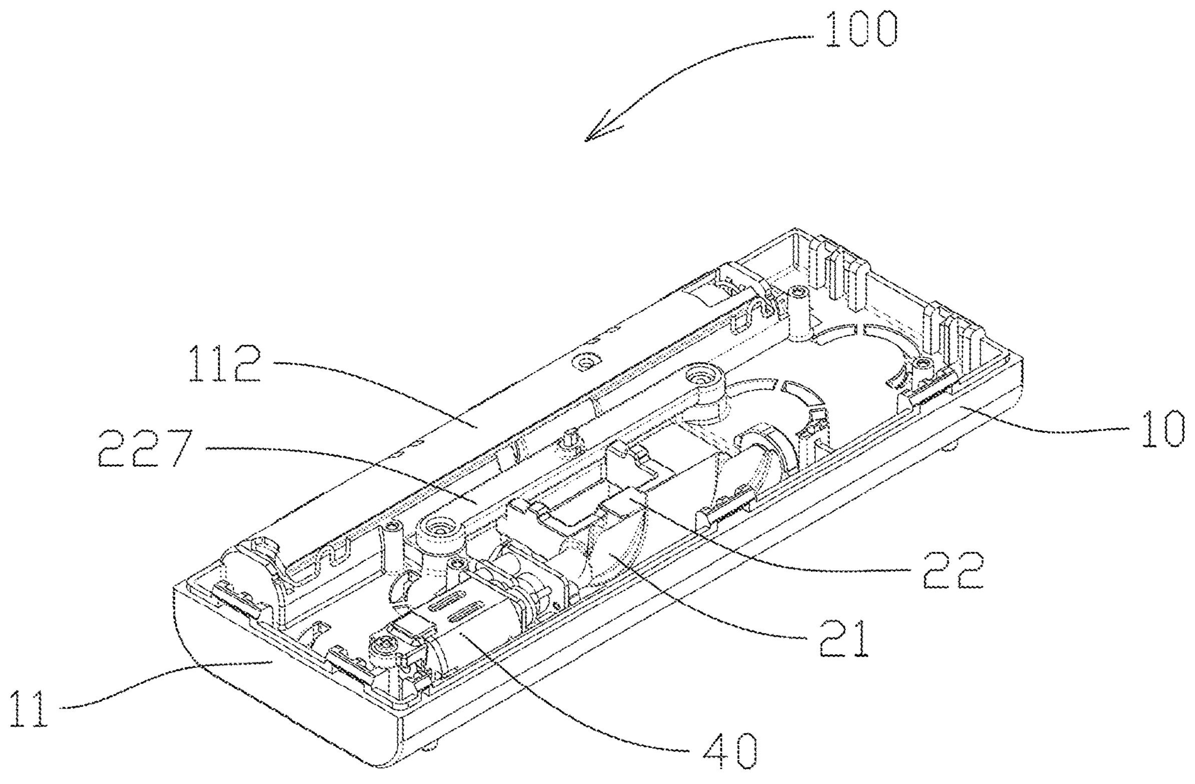
FIG. 4 is a perspective view of a smart switch panel according to an embodiment of the present invention, in which the cover and a circuit board have been removed.

FIG. 1 is a perspective view of a smart switch panel according to an embodiment of the present invention. FIG. 2 is a cross-sectional view of the smart switch panel of FIG. 1. FIG. 3 is a top view of the smart switch panel according to an embodiment of the present invention, in which the cover has been removed. FIG. 4 is a perspective view of the smart switch panel of the present invention, in which the cover and a circuit board have been removed. As shown in FIGS. 1-4, the smart switch panel 100 includes a housing 10, an actuating device 20, a circuit board 30, and a motor 40. The actuating device 20, the circuit board 30, and the motor 40 are arranged in the housing 10, and the circuit board 30 is provided with a microprocessor. On the one hand, the motor 40 is connected to the actuating device 20 and drive the actuating device 20 to move, and the motor 40 is electrically connected to the microprocessor on the circuit board 30 on the other hand. The actuating device 20 cooperates with buttons of a switch (the toggle switch or the rocker switch) and push the buttons of the switch from one state to the other. The microprocessor controls the operation of the actuating device 20 by controlling the movement of the motor 40, thereby controlling the switch to switch between on and off states.

Specifically, the actuating device 20 includes a rotating rod 21 and a driving member 22, the rotating rod 21 cooperates with the driving member 22 and push the driving member 22 to move along the axial direction of the rotating rod 21 when rotating, so as to drive the switch to switch between on and off states when the smart switch panel 100 is mounted on a switch.

Figure 5:
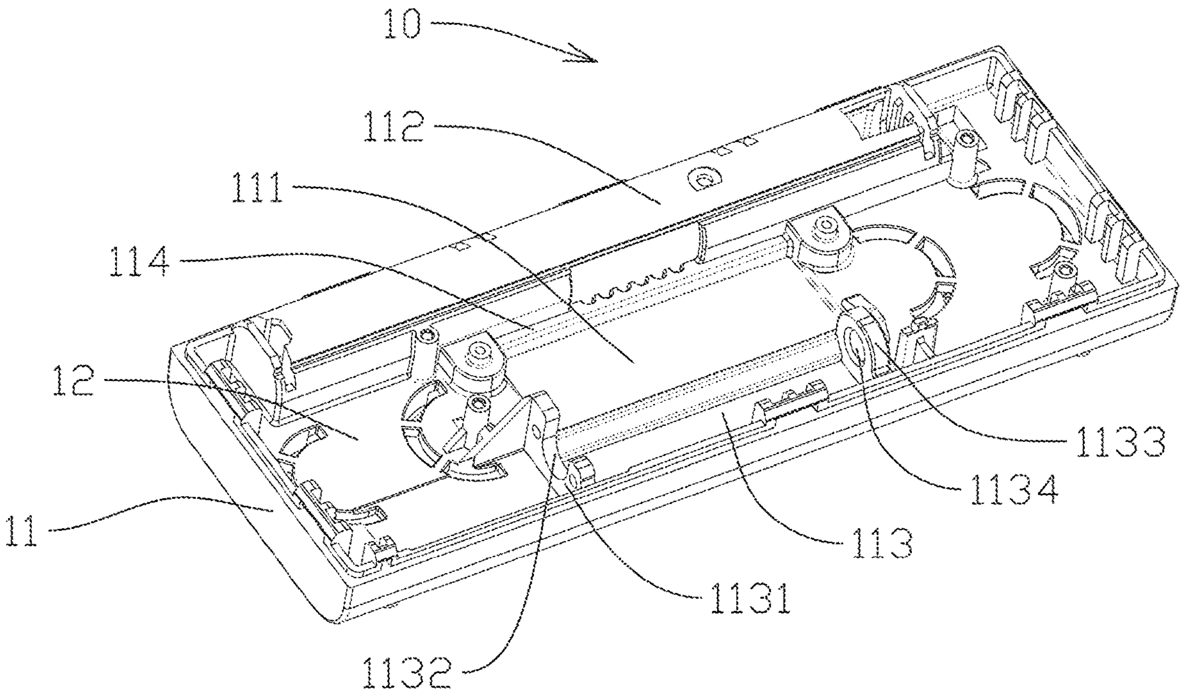
FIGS. 5-6 are different perspective views of a housing according to an embodiment of the present invention, which show the upper surface of the housing that cooperates with the cover from different angles.
Figure 6:
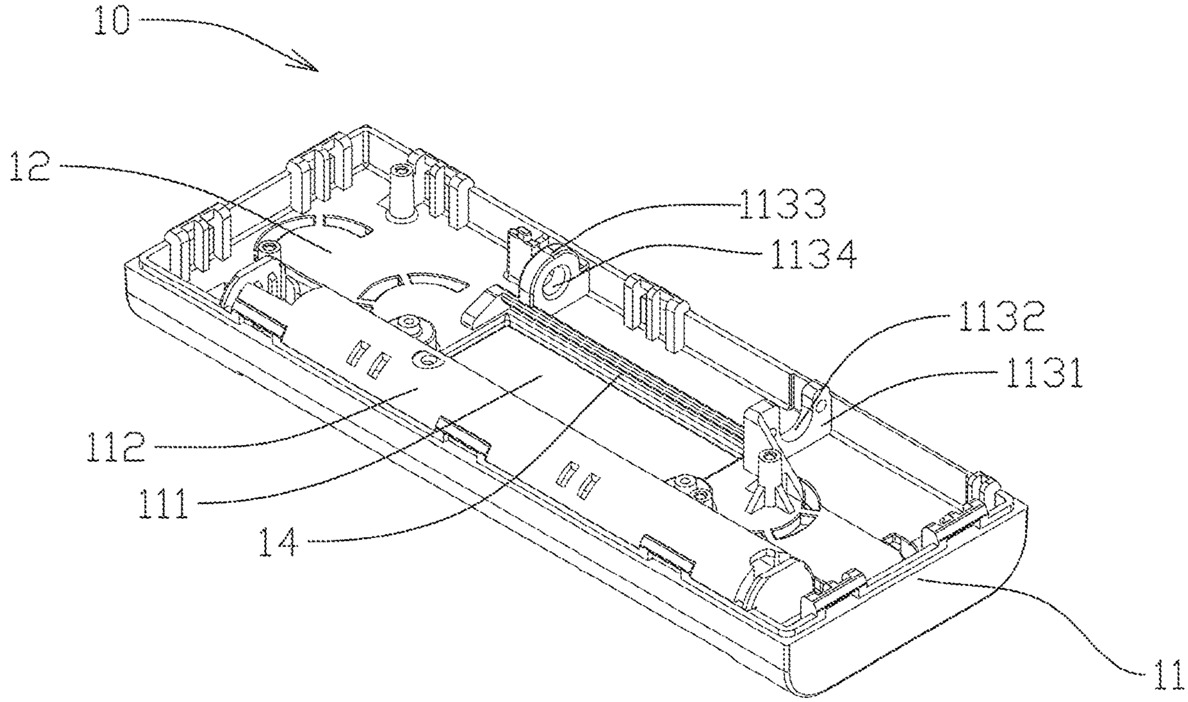
Figure 7:
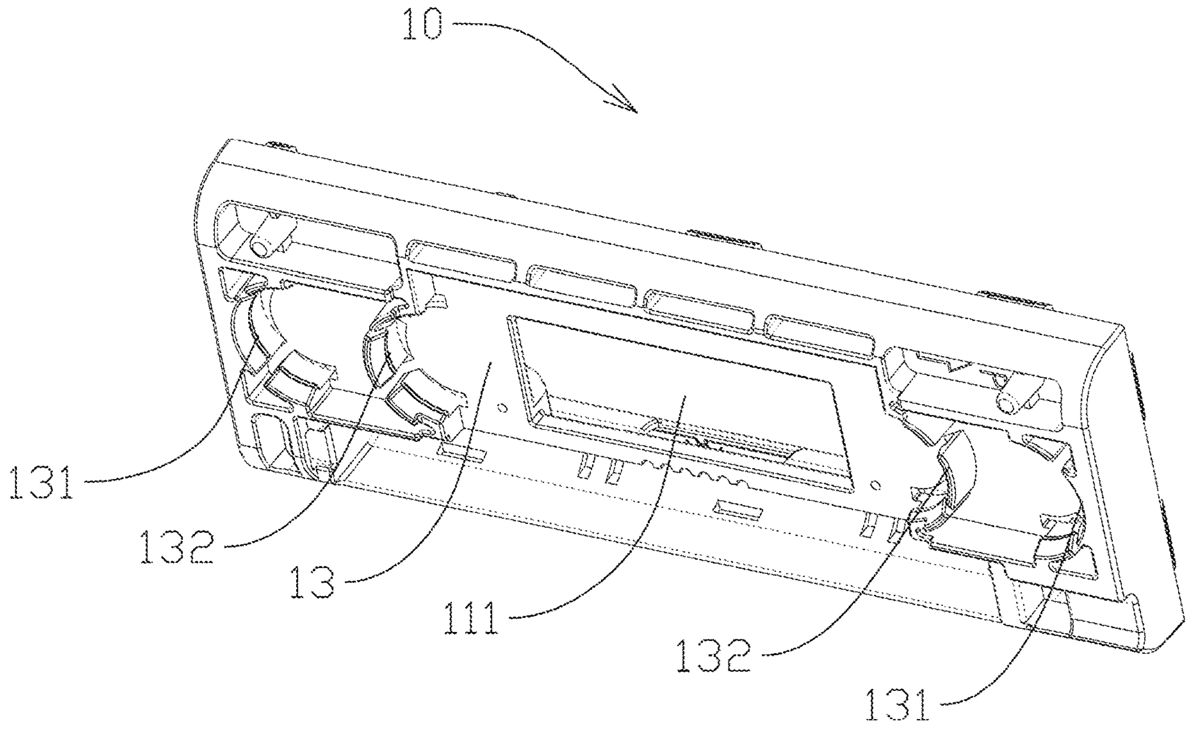
FIG. 7 is another perspective view of a housing of according to an embodiment of the present invention, which shows the lower surface of the housing that cooperates with the switch.

FIGS. 5-6 are different perspective views of a housing 10, which show the upper surface of the housing 10 that cooperates with the cover 50 from different angles. FIG. 7 is another perspective view of a housing 10, which shows the lower surface of the housing 10 that cooperates with the switch. As shown in FIGS. 5-7, the housing 10 includes a rectangular panel main body 11. The main body 11 has an upper surface 12 cooperating with the cover 50 and a lower surface 13 cooperating with the switch to be controlled. The main body 11 is formed with a driving member mounting hole 111 in the middle thereof in which the driver 22 is mounted. The driving member mounting hole 111 extends in the longitudinal direction of the housing 10, and the driving member 22 can move in the longitudinal direction of the housing 10 in the driving member mounting hole 111. A battery mounting slot 112 and a rotating rod mounting portion 113 are respectively formed on both sides of the driving member mounting hole 111. The battery mounting slot 112 is used to accommodate the battery, so as to supply electrical energy to the motor 40, and the rotating rod 21 is mounted in the rotating rod mounting portion 113. The rotating rod mounting portion 113 is provided with a sliding groove 14 extending in the longitudinal direction of the housing 10 at the lower end thereof, and the sliding groove 14 is used to accommodate a sliding block 226 of the driving member 22, which is further described below. A sliding rail 114 is provided on a side of the driving member mounting hole 111 close to the battery mounting slot 112, and cooperates with a blocking plate 227 to limit a protruding block 223 of the driving member 22 within the space defined by the sliding rail 114 and the blocking plate 227, so as to limit the driving member 22 in the vertical direction and cause the driving member 22 to slide only in the longitudinal direction of the housing 10.

Specifically, the rotating rod mounting portion 113 close to the motor 40 is provided with a proximal end block 1131 at one end thereof (hereinafter referred to as the proximal end), the proximal end block 1131 is provided with a rotating groove 1132, and the other end (hereinafter referred to as the proximal end) of the rotating rod 21 close to the motor 40 is mounted in the rotating groove 1132 and fixedly connected with a motor shaft of the motor 40, so as to drive the rotating rod 21 to rotate when the motor 40 operates. The rotating rod 21 away from the motor 40 is provided with a distal block 1133 at one end thereof, the distal block 1133 is provided with a rotating hole 1134, and a distal end of the rotating rod 21 is rotatably mounted in the rotating hole 1134.

Figure 9:
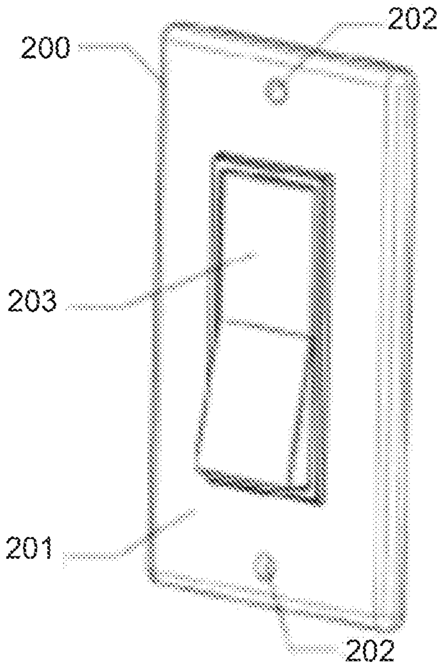
FIG. 9 is the schematic view of a toggle switch.
Figure 10:
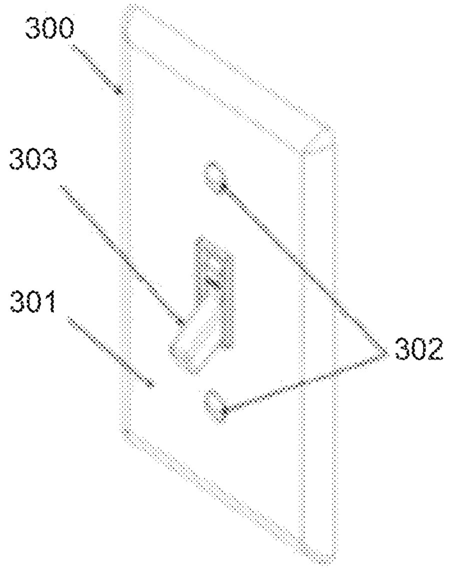
FIG. 10 is a schematic view of a rocker switch.

As shown in FIG. 7, the lower surface 13 of the housing 10 is provided with first connecting portions 131 for cooperating with a rocker switch (e.g., the rocker switch 200 shown in FIG. 9) and second connecting portion 132*s* for cooperating with a toggle switch 300 (e.g., the toggle switch 300 shown in FIG. 10). Specifically, the first connecting portion 131*s* are disposed on both ends of the lower surface 13, and the second connecting portions 132 are disposed inside the first connecting portion 131 and close to the driving member mounting hole 111. The first connecting portions 131 and the second connecting portions 132 are formed by a plurality of protruding elastic tabs enclosing in an arc shape on the lower surface 13 and are used to cooperate with the connecting members 60 respectively.

Figure 8:
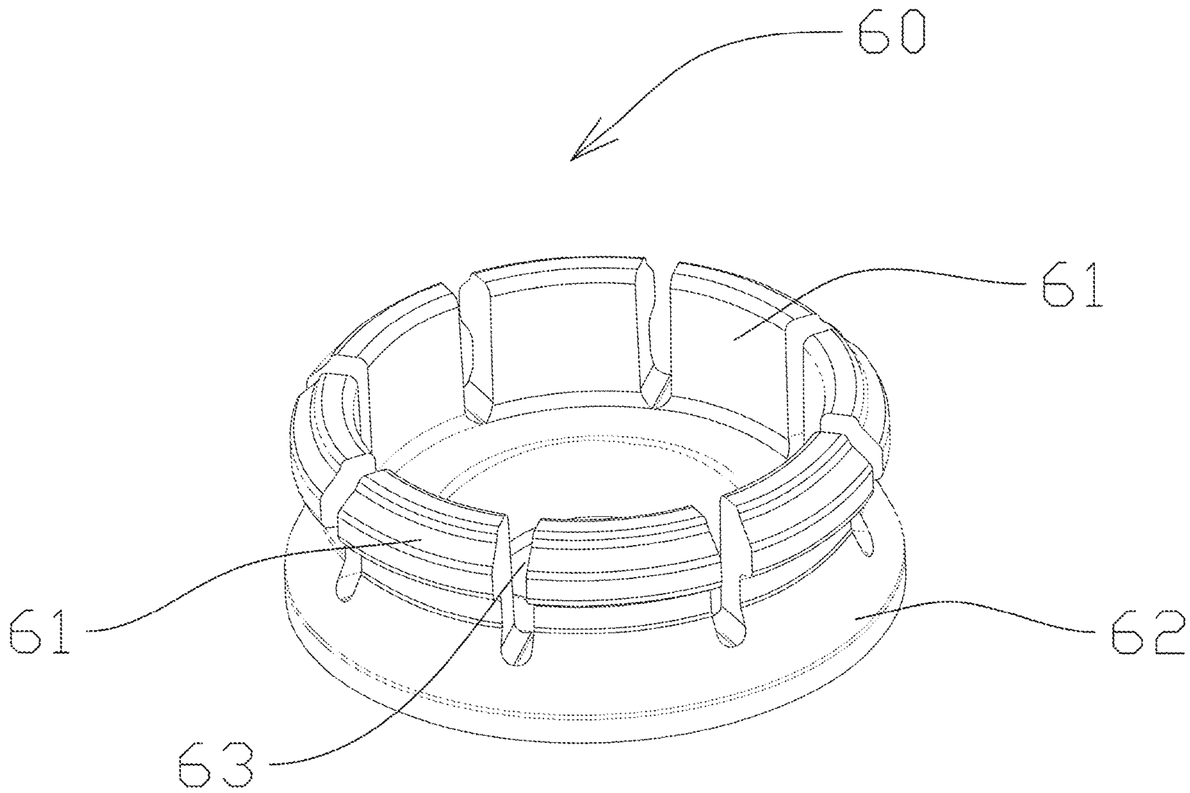
FIG. 8 is a perspective view of a connecting member according to an embodiment of the present invention.

FIG. 8 is a perspective view of the connecting member 60, FIG. 9 is a schematic view of a toggle switch, and FIG. 10 is a schematic view of a rocker switch. As shown in FIGS. 8-10, the connecting member 60 is generally cylindrical in shape and has a cylindrical body, a plurality of elastic tabs 61 are formed at an upper end of the cylindrical body, a peripheral protruding portion 62 protruding outwardly is provided at the middle portion of the cylindrical body, and a fixing hole 63 is formed at the bottom of the cylindrical body. The upper end of the connecting member 60 is used to connect to the first connecting portion 131 or the second connecting portion 132 on the lower surface 13 of the housing 10, and the lower end of the connecting member 60 is used to connect to the switch, for example, by unscrewing screws 302 on a panel 301 of the toggle switch 300 or screws 202 on a panel 201 of the rocker switch 200, and aligning the fixing hole 63 at the bottom of the connecting member 60 with screw holes on the toggle switch 300 (shown in FIG. 7)/rocker switch 200 (shown in FIG. 6), fixedly connecting the connecting member with the toggle switch/the rocker switch by screws, and then connecting the first connecting portion 131 or the second connecting portion 132 of the housing 10 to an upper end opening of the connecting member 60 by means of snap connection, so that the entire smart switch panel 100 is mounted on the switch. During operation, the button 303 of the toggle switch 300 or the button 203 of the rocker switch 200 is driven by the driving member 22, so that the switch is switched between on and off states.

It can be seen from the above description that the smart switch panel of the present invention can be perfectly compatible with toggle switches and rocker switches without replacing any accessories, and has strong versatility and is extremely convenient to use.

Figure 11:
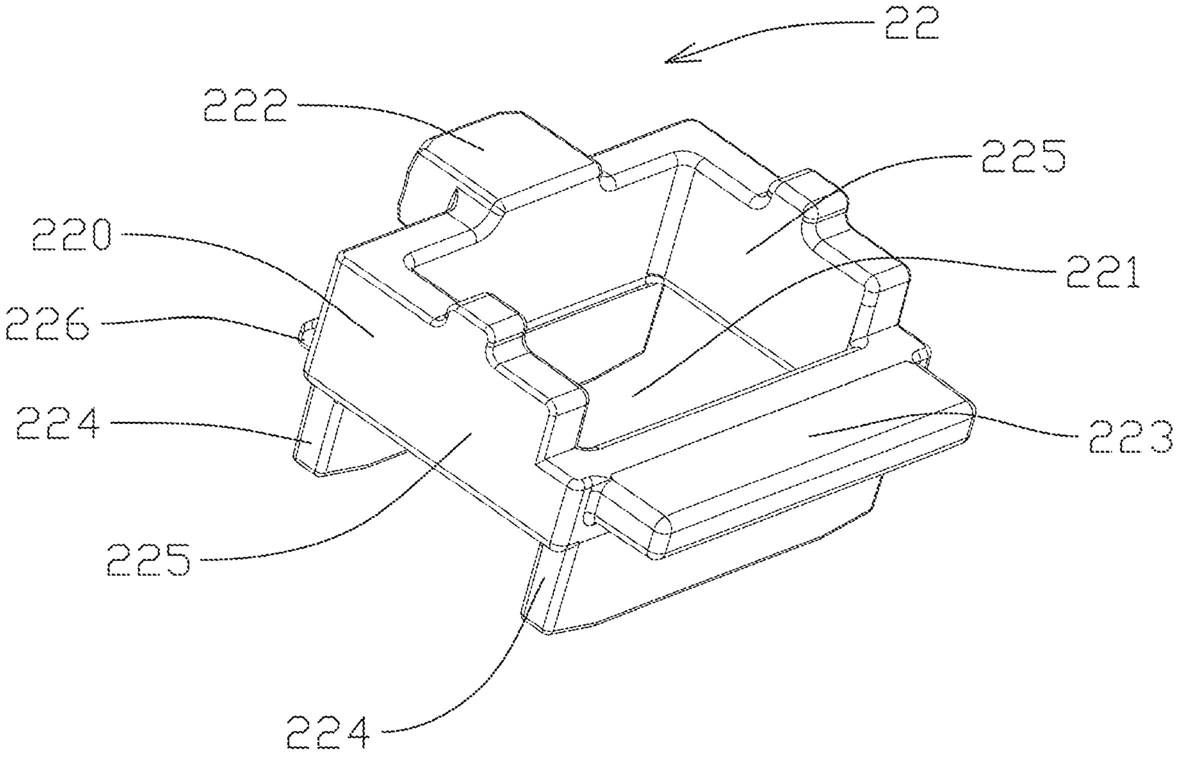
FIGS. 11-12 are perspective views of a driving member according to an embodiment of the present invention.
Figure 12:
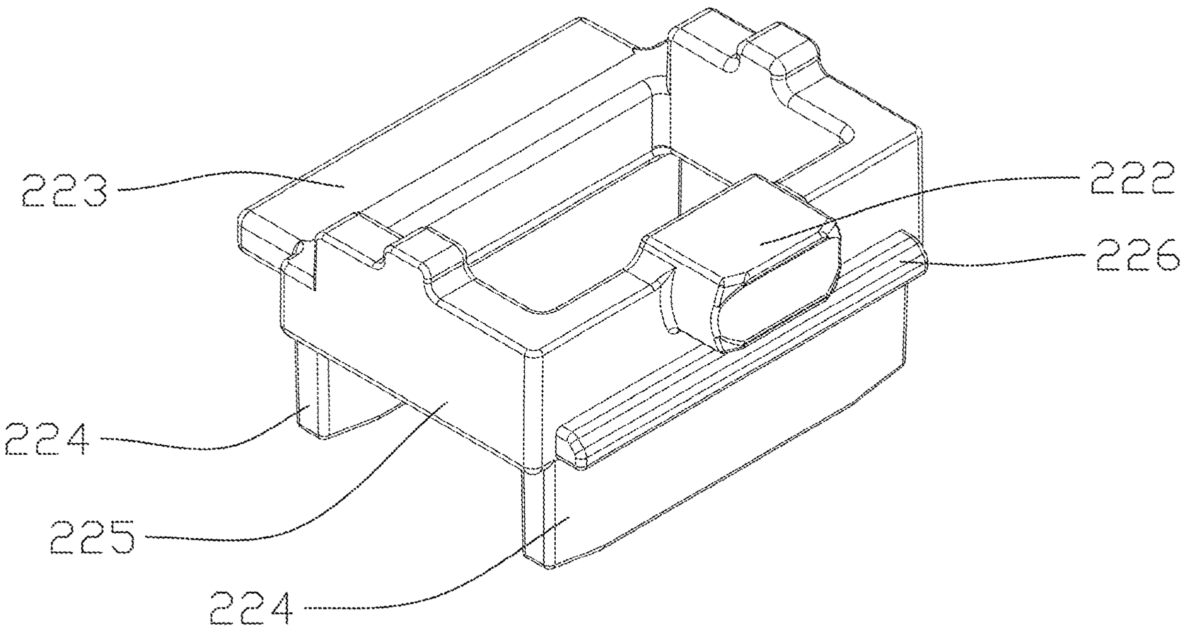

FIGS. 11-12 show different perspective views of the driving member 22. As shown in FIGS. 11-12, the driving member 22 has a main body 220, a central opening 221 is formed in the middle portion of the main body 220. The central opening 221 is enclosed by the surrounding side plates. A protrusion 222 is formed on the outer surface of the side plate of the driving member 22 close to the rotating rod 21. The protrusion 222 is fitted into a helical groove 211 formed in the outer surface of the rotating rod 21, when the rotating rod 21 rotates, the protrusion 222 slides along the helical groove 211, so that the driving member 22 is moved in the direction parallel to the axis of rotation of the rotating rod 21. A protruding block 223 is formed on the side plate of the driving member 22 opposite to the protrusion 222. The protruding block 223 cooperates with the blocking plate 227 and the sliding rail 114, and the blocking plate 227 and the sliding rail 114 limit the driving member 22 vertically. As shown in FIG. 12, the side plate opposite to the protruding block 223 of the driving member 22, that is, the side plate on which the protrusion 222 is provided, is further provided with a sliding block 226, the sliding block 226 is arranged below the protrusion 222 and slidably cooperates with the sliding groove 14 (shown in FIG. 6) in the housing 10, so that the driving member 22 can have four degrees of freedom.

Referring back to FIG. 2, after the driving member 22, the rotating rod 21 and the blocking plate 227 are mounted to the housing 10, the blocking plate 227 cooperates with the sliding rail 114 on the housing 10 and limits the protruding block 223 of the driving member 22 from the upper and lower directions, so that the protruding block 223 can only slide on the sliding rail 114 along the length direction of the housing 10. The sliding block 226 of the driving member 22 extends into the sliding groove 14 of the housing 10, and the driving member is limited to four degrees of freedom by the sliding groove 14. In this way, when the rotating rod 21 is rotated under the driving of the motor 40, the protrusion 222 of the driving member 22 can slide along the helical groove 211 of the rotating rod 21 reliably, and with the driving of the rotating rod 21, cause the driving member 22 to move along the length direction of the driving member mounting groove 111.

Continue with reference to FIGS. 11-12, the driving member 22 is provided with a driving pressing block 224 at the bottom thereof, which is located at the bottom of the side plate where the protrusions 222 and the protruding blocks 223 are provided and extends downward integrally from the bottom of the side plate. When the smart switch panel 100 of the present invention is used for a rocker switch, the driving pressing block 224 cooperates with the button of the rocker switch, and switches between the on and off states of the rocker switch with the movement of the driving member 22. When the smart switch panel 100 of the present invention cooperates with the toggle switch, the bottoms of the other two opposite side plates 225 without the driving pressure block 224 cooperate with a toggle rod of the toggle switch to be used as the driving part, and during the movement of the driving member 22, the toggle rod of the rocker switch is toggled to switch between on and off states.

Figure 13:
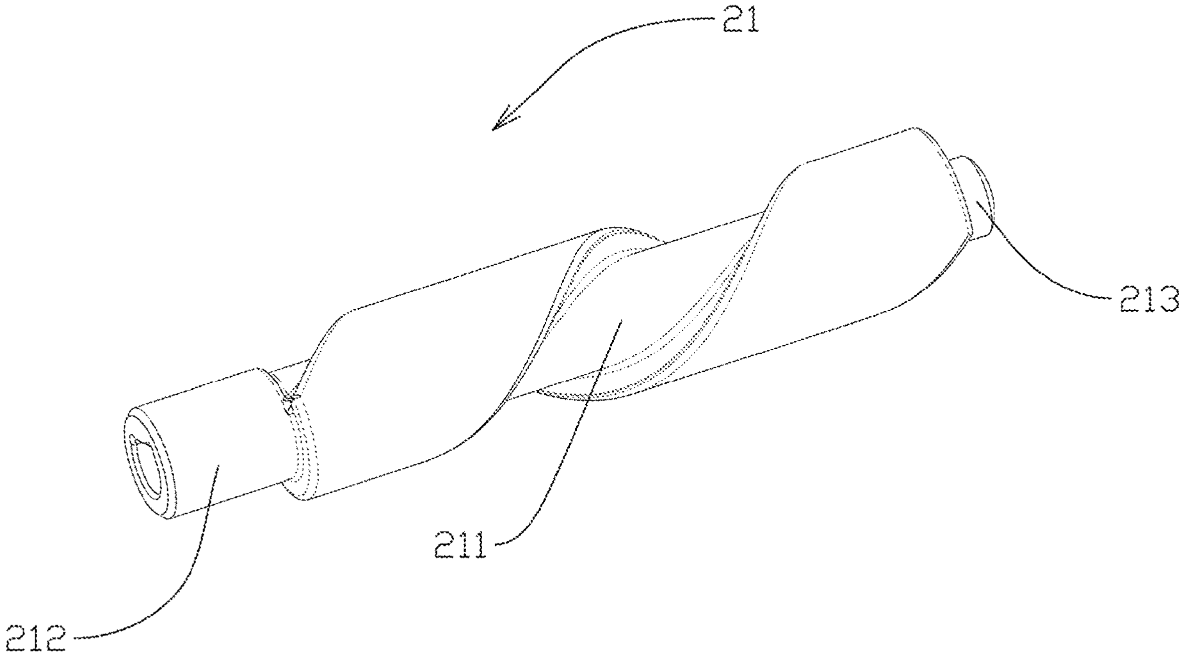
FIG. 13 shows a perspective view of a rotating rod according to an embodiment of the present invention.

FIG. 13 shows a perspective view of the rotating rod 21. As shown in FIG. 13, the outer surface of the rotating rod 21 is formed with a helical groove 211 extending in the axial direction. The width of the helical groove 211 corresponds to the width of the protrusion 222 of the driving member 22 to accommodate the protrusion 222 of the driving member 22. The rotating rod 21 respectively is formed with a first cylinder 212 and a second cylinder 213 with reduced diameters at both ends thereof, the first cylinder 211 cooperates with the rotating shaft of the motor, and the second cylinder 213 cooperates with the rotating rod mounting hole 1133 formed on the housing 10.

Referring back to FIGS. 1-5, the lengths of the driving member mounting hole 111 and the rotating rod mounting portion 113 are approximately equal, so that the driving member 22 is always located in the driving member mounting hole 111 during the movement along the rotating rod 21.

Figure 14:
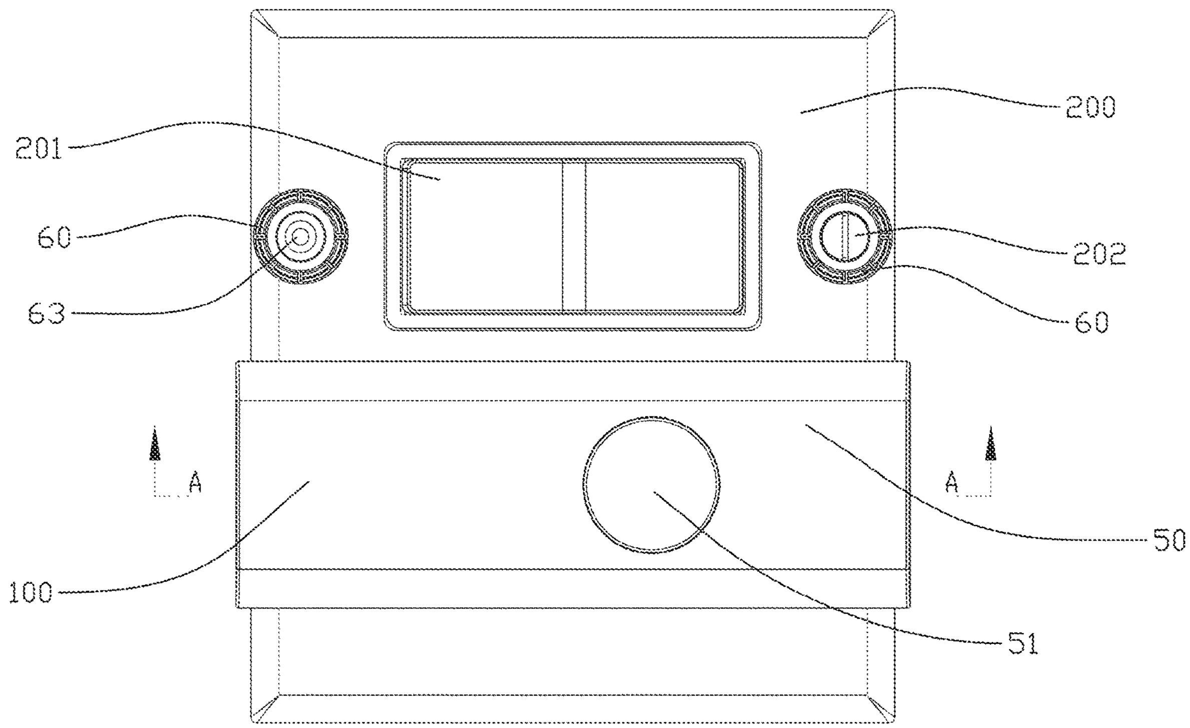
FIG. 14 is a schematic view of a smart switch panel according to an embodiment of the present invention mounted on a rocker switch.
Figure 15:
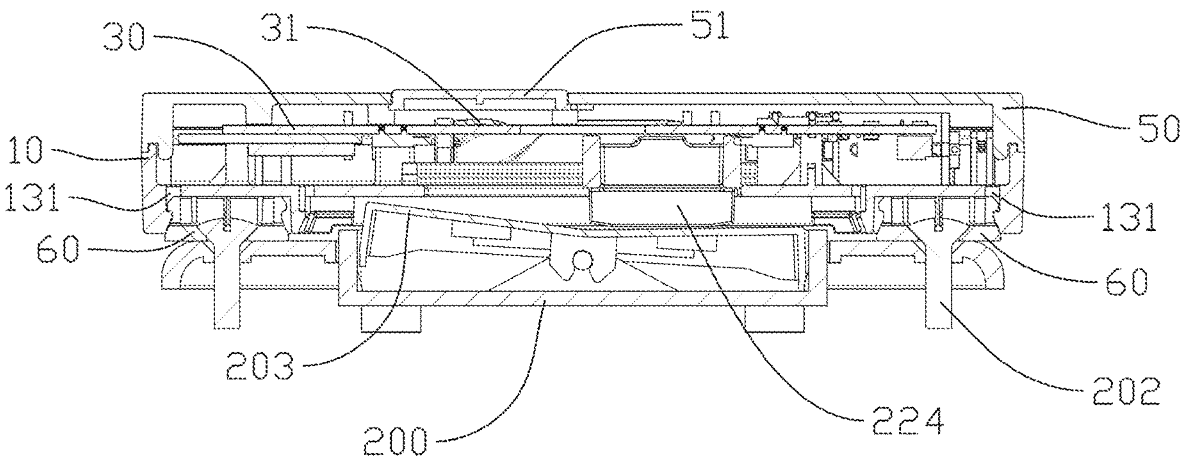
FIG. 15 is a cross-sectional view of the smart switch panel of FIG. 14 taken along line A-A.

FIG. 14 is a schematic diagram of the smart switch panel of the present invention mounted on a rocker switch, and FIG. 15 is a cross-sectional view taken along the line A-A of FIG. 10. As shown in FIGS. 14-15 and in conjunction with FIGS. 8-10, the screws 202 on the panel of the rocker switch 200 are unscrewed, the screw holes on the rocker switch 200 are aligned with the fixing holes 63 at the bottom of the connecting member 60, the connecting member 60 and the rocker switch 200 are fixedly connected by the screws 202, and then the first connecting portion 131 of the housing 10 is connected to the upper end opening of the connecting member 60 by means of snap connection, so that the entire smart switch panel 100 is mounted on the rocker switch 200.

It can be clearly seen from FIG. 15 that when the smart switch panel 100 is mounted on the rocker switch 200, the driving pressing block 224 of the driving member 22 cooperates with the button 203 of the rocker switch, drives the driving member 22 to move along the axial direction of the rotating rod 21 when the motor 40 drives the rotating rod 21 to rotate, and presses the lever-type button of the rocker switch during the movement of the driving member 22, so as to switch between on and off states of the rocker switch. The height of the driving pressing block 224 is set so that when the smart switch panel 100 is mounted on the rocker switch 200, there is a certain distance between the driving pressing block 224 and the part of the switch at the pressed position.

Figure 16:
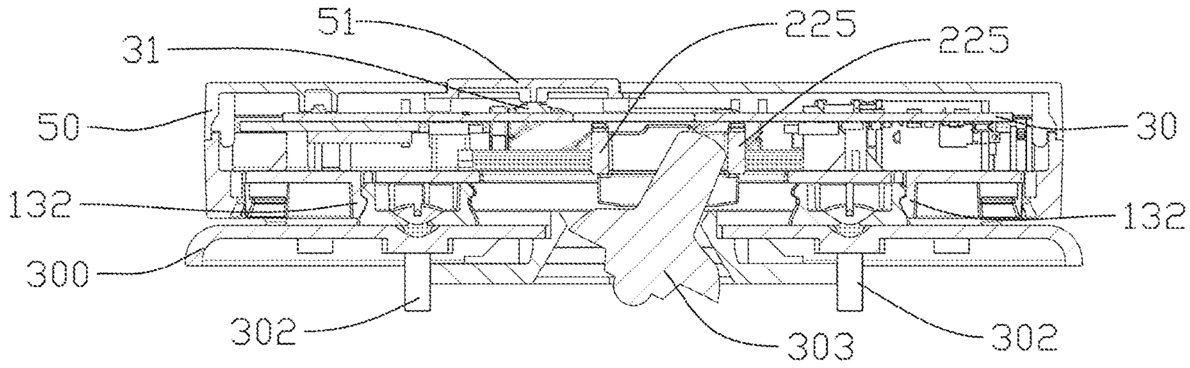
FIG. 16 is a cross-sectional view of a smart switch panel according to an embodiment of the present invention mounted on a toggle switch.

FIG. 16 is a cross-sectional view of the smart switch panel of the present invention mounted on the toggle switch. As shown in FIG. 16 and in conjunction with FIGS. 8-9, by unscrewing the screws on the panel of the lever switch 300, aligning the screw holes on the lever switch 300 with the fixing holes 63 at the bottom of the connector 60, and fixedly connecting the connecting member 60 with the toggle switch 300 by the screws, and then connecting the second connecting portion 132 of the housing 10 to the upper end opening of the connecting member 60 by means of snap connection, the entire smart switch panel 100 is mounted on the toggle switch 300.

It can be clearly seen from FIG. 16 that after the smart switch panel 100 is mounted on the toggle switch 300, the side plate 225 of the driving member 22 cooperates with the toggle rod 303 of the toggle switch 300. Specifically, the toggle rod 303 extends into the grooves defined by the opposite side plates 225 of the driving member 22 and contacts with one of the side plates 225. During the process that the motor 40 drives the rotating rod 21 to rotate and drives the driving member 22 to move axially along the rotating rod 21, the side plate 225 of the driving member 22 exerts a force on the toggle switch 300 and pushes it to toggle in the left-right direction in FIG. 16, so that the toggle switch 300 is switched between on and off states.

The circuit board 30 of the smart switch panel 100 of the present invention is provided with a current limiting circuit, which is used to check whether the motor 40 has turned to position by detecting the current of the motor 40, when the detected current of the motor reaches a specific value, it is confirmed that the motor has turned to position, and the microprocessor controls the motor to stop rotating, and the switch state is switched at this time. When the next opposite command signal comes, the microprocessor controls the motor to rotate in the direction opposite to the previous direction, and the rotating actuating device moves in the opposite direction.

As another way of using the product of the present invention, the button 51 on the outer surface of the cover body 50 is pressed, the button 31 on the circuit board 30 is triggered, so that the microprocessor works and controls the motor to rotate.

The preferred embodiments of the present invention have been described in detail above, but it should be understood that after reading the above teaching content of the present invention, those skilled in the art can make various changes or modifications to the present invention. Such equivalents also fall within the scope defined by the claims appended hereto.

What is claimed is:

1. A smart switch panel, wherein comprising:

a housing;

an actuating device arranged in the housing;

a microprocessor arranged in the housing which controls the actuating device; wherein the actuating device includes a rotating rod and a driving member, the rotating rod cooperates with the driving member and is configured to drive the driving member to translate when the rotating rod rotates.

2. The smart switch panel according to claim 1, wherein an outer surface of the rotating rod is provided with a helical groove extending in an axial direction, and the driving member is provided with a protrusion on one side thereof for cooperating with the helical groove.

3. The smart switch panel according to claim 2, wherein the driving member is further provided with a protruding block on a side thereof opposite to the protrusion, which cooperates with a corresponding structure on the housing to limit the driving member vertically.

4. The smart switch panel according to claim 3, wherein the driving member is provided with a central opening cooperating with a toggle switch, and the central opening is formed by side plates surrounding, and the driving member is provided with a driving pressing block at a bottom thereof for cooperating with a rocker switch.

5. The smart switch panel according to claim 4, wherein the driving pressing block is located at a bottom of the side plate where the protrusion and the protrusion block are provided, and the driving pressing block extends integrally downward from the bottom of the side plate.

6. The smart switch panel according to claim 4, wherein the corresponding structures on the housing are a sliding rail and a blocking plate, wherein the blocking plate is installed above the sliding rail and limits the protruding block in a direction perpendicular to the slide rail.

7. The smart switch panel according to claim 6, wherein the driving member is further provided with a sliding block, which is provided on a side plate below the protrusion, and the housing is provided with a sliding groove cooperating with the sliding block, when the driving member is mounted in a driving member mounting groove of the housing, the sliding block extends into the sliding groove.

8. The smart switch panel according to claim 1, wherein the housing comprises a main body, which has an upper surface cooperating with a cover and a lower surface cooperating with the switch to be controlled, wherein the lower surface is provided with first connecting portions for cooperating with the rocker switch and second connecting portions for cooperating with the toggle switch.

9. The smart switch panel according to claim 8, wherein the first connecting portions are disposed on both ends of the lower surface, and the second connecting portions are disposed between the first connecting portions.

10. The smart switch panel according to claim 9, wherein the smart switch panel further comprises a connecting member, wherein the first connecting portions and the second connecting portions are formed by a plurality of protruding elastic tabs enclosing in an arc shape on the lower surface and are used to cooperate with the connecting member respectively.

11. The smart switch panel according to claim 10, wherein the connecting member has a cylindrical body forming with a plurality of elastic tabs at an upper end thereof a peripheral protruding portion protruding outwardly at the middle portion thereof, and a fixing hole at the bottom thereof.

12. The smart switch panel according to claim 8, wherein the main body is formed with a driving member mounting hole in the middle thereof in which the driving member is mounted, wherein the driving member mounting hole extends along the length direction of the housing, thereby the driving member is movable along the length direction of the housing in the driving member mounting hole.

13. The smart switch panel according to claim 12, wherein a battery mounting slot and a rotating rod mounting portion are respectively formed on both sides of the driving member mounting hole, wherein the battery mounting slot is used to accommodate a battery, and the rotating rod is accommodated in the rotating rod mounting portion.

14. The smart switch panel according to claim 1, wherein the smart switch panel further includes a motor, which is installed in the housing and connected with the rotating rod to drive the rotating rod to rotate, wherein the motor is coupled to the microprocessor.

15. The smart switch panel according to claim 14, wherein the smart switch panel further comprises a circuit board, which is provided with a wireless communication module and the microprocessor.

16. The smart switch panel according to claim 15, wherein the circuit board is provided with a current limiting circuit, which is used to check whether the motor has turned in place by detecting a current of the motor.

17. The smart switch panel according to claim 15, wherein the smart switch panel further comprises a cover, which cooperates with the upper surface of the housing, wherein the cover is provided with a button, the circuit board is provided with a pressing key cooperating with the button, and the pressing key is connected to the microprocessor.

18. The smart switch panel according to claim 1, wherein the rotating rod and the driving member are configured to drive the driving member to move in a direction parallel to a rotation axis of the rotating rod when the rotating rod rotates, so as to drive a switch to switch between on and off states when the smart switch panel is mounted on the switch.

19. A smart remote control switch system, comprising:

the smart switch panel of claim 1;

a cloud server for receiving and sending signals; and a client terminal for sending a signal to the cloud server;

wherein the client terminal, the cloud server and the smart switch panel are connected through a wireless network.

20. The smart remote control switch system according to claim 19, wherein the smart remote control switch system further comprises a HUB, which includes a WIFI/ZigBee module for converting signals.

* * * * *